US012670555B2

(12) United States Patent
Palatnik de Sousa

(10) Patent No.: US 12,670,555 B2
(45) Date of Patent: Jun. 30, 2026

(54) UNSUPERVISED SMOOTHING DEFENSE AGAINST ADVERSARIAL IMAGES

(71) Applicant: Dell Products L.P., Round Rock, TX (US)

(72) Inventor: Iam Palatnik de Sousa, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 422 days.

(21) Appl. No.: 18/176,813

(22) Filed: Mar. 1, 2023

(65) Prior Publication Data

US 2024/0296526 A1 Sep. 5, 2024

(51) Int. Cl.
| | |
|---|---|
| *G06T 5/00* | (2024.01) |
| *G06T 5/70* | (2024.01) |
| *G06V 10/764* | (2022.01) |
| *G06V 10/98* | (2022.01) |

(52) U.S. Cl.
CPC .............. *G06T 5/70* (2024.01); *G06V 10/764* (2022.01); *G06V 10/98* (2022.01); *G06T 2207/20192* (2013.01)

(58) Field of Classification Search
None
See application file for complete search history.

(56) References Cited

U.S. PATENT DOCUMENTS

2023/0244949 A1* 8/2023 Lin ......................... G06N 3/09
706/25

FOREIGN PATENT DOCUMENTS

JP 7584782 B2 * 11/2024

OTHER PUBLICATIONS

Gupta et al., "Adversarial Input Detection Using Image Processing Techniques (IPT)", DOI: 10.1109/UEMCON51285.2020.9298060). (Year: 2020).*
Guo et al., Counter Adversarial Images Using Input Transformations, DOI: https://doi.org/10.48550/arXiv.1711.00117 (Year: 2018).*
Rudin et al., "Nonlinear total variation based noise removal algorithms", DOI: https://doi.org/10.1016/0167-2789(92)90242-F (Year: 1992).*
Prakash et al., "Deflecting Adversarial Attacks with Pixel Deflection", DOI: https://doi.org/10.48550/arXiv.1801.08926 (Year: 2018).*
Ratzlaff and Fuxin, "Unifying Bilateral Filtering and Adversarial Training for Robust Neural Networks", DOI: https://doi.org/10.48550/arXiv.1804.01635 (Year: 2018).*
Jia et al., "ComDefend: An Efficient Image Compression Model to Defend Adversarial Examples", Publication Year: 2019, https://doi.org/10.48550/arXiv.1811.12673 (Year: 2019).*

(Continued)

*Primary Examiner* — Chan S Park
*Assistant Examiner* — Promotto Tajrian Islam
(74) *Attorney, Agent, or Firm* — Workman Nydegger

(57) ABSTRACT

One example method includes accessing an adversarial image, processing the adversarial image by applying a smoothing defense to the adversarial image, and classifying the processed adversarial image. The smoothing defense, which may be an unsupervised process, may include a noising process, such as a gaussian noising process, and an edge-preserving process. The smoothing defense can be implemented against basic iterative method (BIM) attacks, as well as fast gradient sign method (FGSM) attacks.

14 Claims, 4 Drawing Sheets

(56)　　　　　　References Cited

OTHER PUBLICATIONS

Byun et al., "On the Effectiveness of Small Input Noise for Defending Against Query-based Black-Box Attacks", Publication Year: 2022, 10.1109/WACV51458.2022.0038 (Year: 2022).*

Lin et al., "Robust Defense Against Adversarial Attacks with Defensive Preprocessing and Adversarial Training", Publication Year 2025, 10.1109/ICCE63647.2025.10930084 (Year: 2025).*

Chakraborty et al., A survey on adversarial attacks and defences, Dec. 22, 2020, CAAI Transactions on Intelligence Technology, 25-45, 6/1.

Ilyas et al., Adversarial examples are not bugs, they are features, Aug. 12, 2019, Advances in neural information processing systems, arXiv:1905.02175v4 [stat.ML].

Smilkov et al., SmoothGrad: removing noise by adding noise, Jun. 12, 2017, arXiv:1706.03825v1 [cs.LG].

* cited by examiner

500

| NO DEFENSE | WITH DEFENSE |
| --- | --- |
| 0.00 | 0.70 |

600

| $\varepsilon_{FGSM}$ | NO DEFENSE | WITH DEFENSE |
| --- | --- | --- |
| 0.1 | 0.07 | 0.10 |
| 0.01 | 0.02 | 0.25 |
| 0.001 | 0.38 | 0.64 |

UNSUPERVISED SMOOTHING DEFENSE AGAINST ADVERSARIAL IMAGES

FIELD OF THE INVENTION

Embodiments of the present invention generally relate to adversarial attacks in the context of deep neural networks. More particularly, at least some embodiments of the invention relate to systems, hardware, software, computer-readable media, and methods, for implementing an unsupervised defense against adversarial attacks to recover an image class prediction after that prediction was attacked.

BACKGROUND

Adversarial attacks are a known vulnerability of Deep Neural Networks. Such attacks typically involve small perturbations applied to the inputs of a classifier, which can cause a number of undesirable effects. The most common goal of these attacks is to cause misclassification, deteriorating the performance of the predictive functionality of the model. In more serious threats, an adversary might also use these attacks to manipulate a model into making specific harmful decisions. For example, a model could be manipulated by an attacker to misclassify, as clean, an X-ray that actually shows a tumor.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
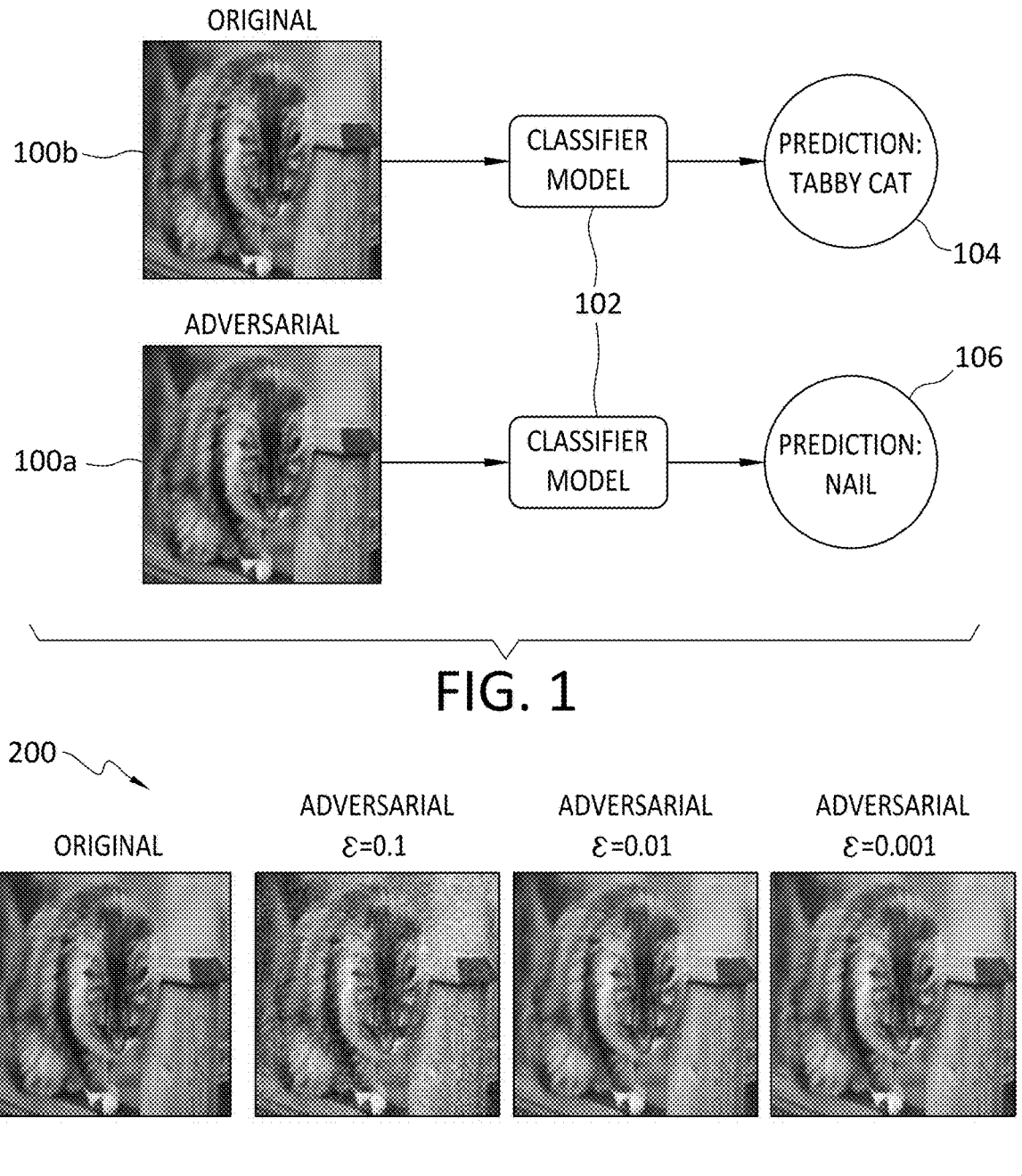
FIG. 1 discloses the effect of an adversarial attack on an image classification.
FIG. 2 discloses an effect of the parameter $\varepsilon_{FGSM}$ in generating adversarial images.

Embodiments of the present invention generally relate to adversarial attacks in the context of deep neural networks. More particularly, at least some embodiments of the invention relate to systems, hardware, software, computer-readable media, and methods, for implementing an unsupervised defense against adversarial attacks to recover an image class prediction after that prediction was attacked.

In general, an example embodiment of the invention comprises an unsupervised defense that involves smoothing a gradient response elicited by an adversarial image created by an attacker, so as to recover the original class prediction in the process. The smoothing may comprise a combination of noising and blurring filters. This simple, yet effective, procedure may enable the recovery of the original classification, and does not require computationally expensive retraining of the model, or usage of complex generative models, as in some conventional approaches.

In more detail, an embodiment of the invention may comprise a two-step smoothing pre-processing, which may be applied to images that have been subjected to an adversarial attack, in order to undo the effects of adversarial optimization. First, noise may be added to the image, and then this noise may be smoothed, bringing the image closer to the original once again. In this process, the specific perturbations that create the adversarial attack are disrupted enough that the attack stops working in a majority of cases. Note that both the noising and smoothing steps may be implemented in various ways. One embodiment may employ an approach that requires no training and has lower computational cost, as compared with some conventional approaches. By using unsupervised techniques such as blurring filters, and prior minimization, an embodiment may be able to achieve considerable defense in a realistic attack scenario, against two state of the art attacks in a number of configurations. These experimental results are further discussed elsewhere herein. As an example, one particular embodiment of this defense method may comprise the following: (1) adding gaussian noise to the images, scaled by a factor; and (2) applying an edge preserving bilateral blur onto the images to which the gaussian noise has been added.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an unsupervised defense may be used to defend against adversarial attacks on an image classification. As another example, an embodiment of the invention may be relatively easy to implement and does not require the computing resources implied by conventional approaches to defending against image classification attacks. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

One particular realm in which adversarial attacks have been explored is computer vision. The main type of attack in this case involves creating adversarial images that are, to the naked eye, visually indistinguishable from normal images, yet cause arbitrarily large changes on the prediction probabilities, even to the point of leading to misclassification of the image by an image classification model. FIG. 1 discloses an example of such an attack from an experiment described elsewhere herein. Note how the adversarial image 100*a* and the original image 100*b* are visually indistinguishable, at least to the human eye. As shown in FIG. 1, however, a visually indistinguishable image can nonetheless cause a significant misclassification. Particularly, a classifier model 102 may classify 104, or predict, the original image 100*b* as a tabby cat, while the classifier model 102 may classify 106, or predict, the adversarial image 100*a* as a nail. Thus, an embodiment of the invention may comprise a defense method whereby an adversarial image undergoes a combination of noise addition, and smoothing, in order to undo the effects of adversarial attacks, before classification of the image.

A.1 Adversarial Attacks

In order to better understand the details of an embodiment of the invention, a discussion is first presented describe some attacks in more detail. The scope of the invention is not necessarily limited for use in connection with any particular attack(s).

A.1.1 Fast Gradient Sign Method (FGSM)

One of the most common adversarial attacks discussed in literature is known as the Fast Gradient Sign Method (FGSM). Once an image 'I' passes through an image classifier model 'J,' it is possible to calculate the gradients of an output neuron, for instance, the predicted class 'y' for the image, back to the input neurons 'x,' corresponding to each pixel in the image.

In more detail, when an image is passed through a classification model, which may comprise a neural network, the values for each pixel of the image move gradually through the neural network until they reach the output layer. Those output values are then passed through what is referred to as a loss function, which is a function that indicates to what extent the model got the task at hand right, or wrong. Typically, when training a neural network, a calculation is performed as to the extent to which changing each parameter in the network will influence this loss function, where the change over a parameter is referred to as the gradient. The parameters may the be changed accordingly to reduce the loss function.

In the context of the present invention, the weights of the neural network of an image classifier model are not changed by the adversarial attack, since the network is not being trained. Instead, the attack is concerned with training the input image itself so that the input image will fool the model. Thus, a calculation may be performed by the attacker as to how much small changes in the input pixel values will change the loss function. The loss function in this case is related to the task of 'making the model misclassify' while keeping the adversarial image as close as possible to the original image. The gradient is related to how changes in the input influence this task. Once it is known how much these small changes affect the loss, the attacker may change those pixels by a little bit, and then go to the next iteration of the loop, where the process is repeated. The longer this process runs, the more the input image will have its pixels changed to fool the classifier. Once the loss function has remained the same for too many steps, that is, the loss function has converged, or the attack has achieved a given threshold as to the extent to which the classifier is being fooled, the process, or attack, may be stopped. The resulting image is the adversarial image.

The FGSM attack simply adds the sign of this gradient back to the original image, multiplied by a scaling factor $\varepsilon_{FGSM}$. In this way, it may be easier for the attacker to control the magnitude of the perturbation and make sure that the perturbation is small enough not to be visually perceptible. The effect is that the image has each feature, that is, each pixel value, pushed in the direction that would maximize the gradient for the particular class $y_{target}$. The intuition is that this has a large chance of changing the predicted class for the image, which is indeed observed in practice. The targeted class may be the same as the predicted class, or may be a different class.

As such, the FGSM attack can be summarized by the equation:

$$Ia = Io + \varepsilon_{FGSM} * \text{sign}(\nabla J(x, y_{target}))$$

Where Ia is the adversarial image and Io is the original image from which the adversarial image was generated. Because of this formulation, FGSM results in a single gradient computation and a single step in generating the adversarial image, which makes FGSM very fast, hence the name.

The FGSM attack, however, has two notable shortcomings, from the perspective of an attacker. Firstly, because the adversarial image is generated in a single optimization step, the adversarial image may often fail to actually fool the model. In fact, a considerable percentage of adversarial images might still be correctly classified, forcing the attacker to increase the value of $\varepsilon_{FGSM}$. Higher values for this factor, however, result in more visually distorted images, as shown in the example images 200 in FIG. 2. For the particular case referred to herein, values of εFGSM below 0.01 seem to generate less visible perturbation to the naked eye.

Secondly, another shortcoming is that FGSM does not allow an attacker to manipulate a model into choosing an arbitrary class chosen by the attacker. That is to say, the attacker has a chance of making a model misclassify an image, but has little control on what the model will misclassify to, that is, how the model will misclassify the image. In practical terms, this would mean the attacker can cause a model to misclassify a cat for some other random class, usually resulting in a low prediction probability for the adversarial image.

Thus, FGMS is not a viable attack if, for instance, the adversary wants to specifically make a model misclassify a cat for a giraffe with a prediction probability of 85%, or some other arbitrary value. There is however such an attack, called the Basic Iterative Method (BIM).

A.1.2 Basic Iterative Method (BIM)

BIM is a generalization and expansion of FGSM where the attack is repeated iteratively until the adversarial image causes the model to misclassify to a specific class, and with an arbitrarily high prediction probability. This attack can be expressed as:

$$(Ia)_N = \text{clip}[(Ia)_{N-1} + \varepsilon_{BIM} * \text{sign}\{\nabla J(x, y_{target})\}]$$

where this iterative process is subjected to gradient descent, trying to minimize the following loss:

$$L_{BIM} = 1 - y_{target}.$$

From this formulation, it is possible to see that an adversarial image that minimizes $L_{BIM}$ maximizes a prediction of class $y_{target}$. The optimization can be run as long as necessary in order to increase the prediction probability of the target class chosen by the adversary. In practice, to aid in the convergence of this optimization, the values used for $\varepsilon_{BIM}$ are smaller than those used for $\varepsilon_{FGSM}$. This is because BIM is basically guaranteed to succeed in generating a strong adversarial image if the optimization is run for long enough, whereas it is unpredictable whether FGMS will work, or not, in its single attacking step. As such, BIM is a notably more dangerous attack than FGSM, both because BIM is more guaranteed to be effective, and BIM gives more control to the attacker in manipulating the model to output the prediction of a certain class specified by the attacker.

B. General Aspects of Some Example Embodiments

Advantageously, an embodiment of the invention may comprise a material improvement over some existing defenses against adversarial images. A discussion of some possible improvements follows.

Research on defensive methods against adversarial attacks is a recently blooming field. Typically, defense methods focus on one or more of the following kinds: adversarial training; detection; and reconstruction.

B.1 Adversarial Training

This defense method aims at increasing model robustness by including adversarial examples during training. This is a much more complex and computationally costly approach compared to the approach implemented by one or more embodiments of the invention, and is not mutually exclusive. Adversarially trained models may benefit from a method according to an embodiment of the invention. This method is also sometimes referred to as model hardening.

B.2 Detection

Some defense mechanisms attempt to detect adversarial images with specifically trained models. These may be common classifier architectures or more complex specifically trained Generative Adversarial Networks (GANs). Among the solutions that harness the power of GAN architectures, the internal representations of the GAN can be used to ascertain whether a given adversarial image is similar to the expected distribution of data or whether that image is out-of-distribution (OOD). Training such models, however, is not trivial, and is highly dependent on each specific task.

6

B.3 Reconstruction

Yet another approach to dealing with adversarial attacks involves attempting to reconstruct inputs that have been adversarially tampered with by use of generative models such as GANs. The key limitation with these is that GANs are notoriously complex to train, especially in a case where the reconstructed image must be extremely reliable and similar to the original dataset.

B.4 Advantages

Among other things, an embodiment of the invention may be significantly less expensive, at least in terms of computing resource consumption, than some of the approaches noted above. In particular, those methods invariably require sophisticated models which typically need to be separately trained, which can result in considerable computational costs. This could limit application or scalability in certain scenarios, such as low resource scenarios as is often the case with certain edge devices, or depending on the size of the dataset that has potentially been attacked.

As another example of a possible advantage of an embodiment of the invention, such an embodiment may avoid the need for supervised defenses, as are typically employed in the approaches noted above. Particularly, such defenses typically also rely on some form of supervised training, whether in the model hardening cases, or in the detection cases. This training is not trivial and might not always be an option, depending on how many instances of adversarial data are available. Even when existing models are properly trained, they might need periodic, costly re-training to avoid data drift and other such issues. Thus, an embodiment of the invention may avoid these concerns by employing unsupervised methods to handle adversarial attacks.

C. Detailed Discussion

C.1 Introduction

An embodiment of the invention may comprise a two-step smoothing pre-processing, which is applied to an adversarial image, in order to undo, either wholly or in part, the effects of adversarial optimization on the image. More specifically, an embodiment may operate on an adversarial image to process the adversarial image in such a way that when the processed adversarial image is sent to a classifier, the classifier will correctly classify the processed adversarial image.

In the first step, according to one embodiment, noise is added to the adversarial image, and in the second step, this noise is smoothed, bringing the image closer to the original once again. In this process, the specific perturbations that create the adversarial attack are disrupted enough that the attack stops working in a majority of cases. Both the noising and smoothing steps may be implemented in a variety of ways. While it may be possible to use sophisticated deep learning models, with costly and complex supervised training procedures, for this purpose, an embodiment of the invention may be much simpler, and less expensive and time-consuming to implement.

Particularly, an embodiment may be implemented without requiring any training, and may have a relatively low computational cost, as compared with conventional approaches. By using unsupervised techniques such as blurring filters and prior minimization, an embodiment may achieve considerable defense in a realistic attack scenario, against two state of the art attacks in a number of configurations. Some experimental results of one embodiment are disclosed and discussed elsewhere herein.

Figures 3, 4:
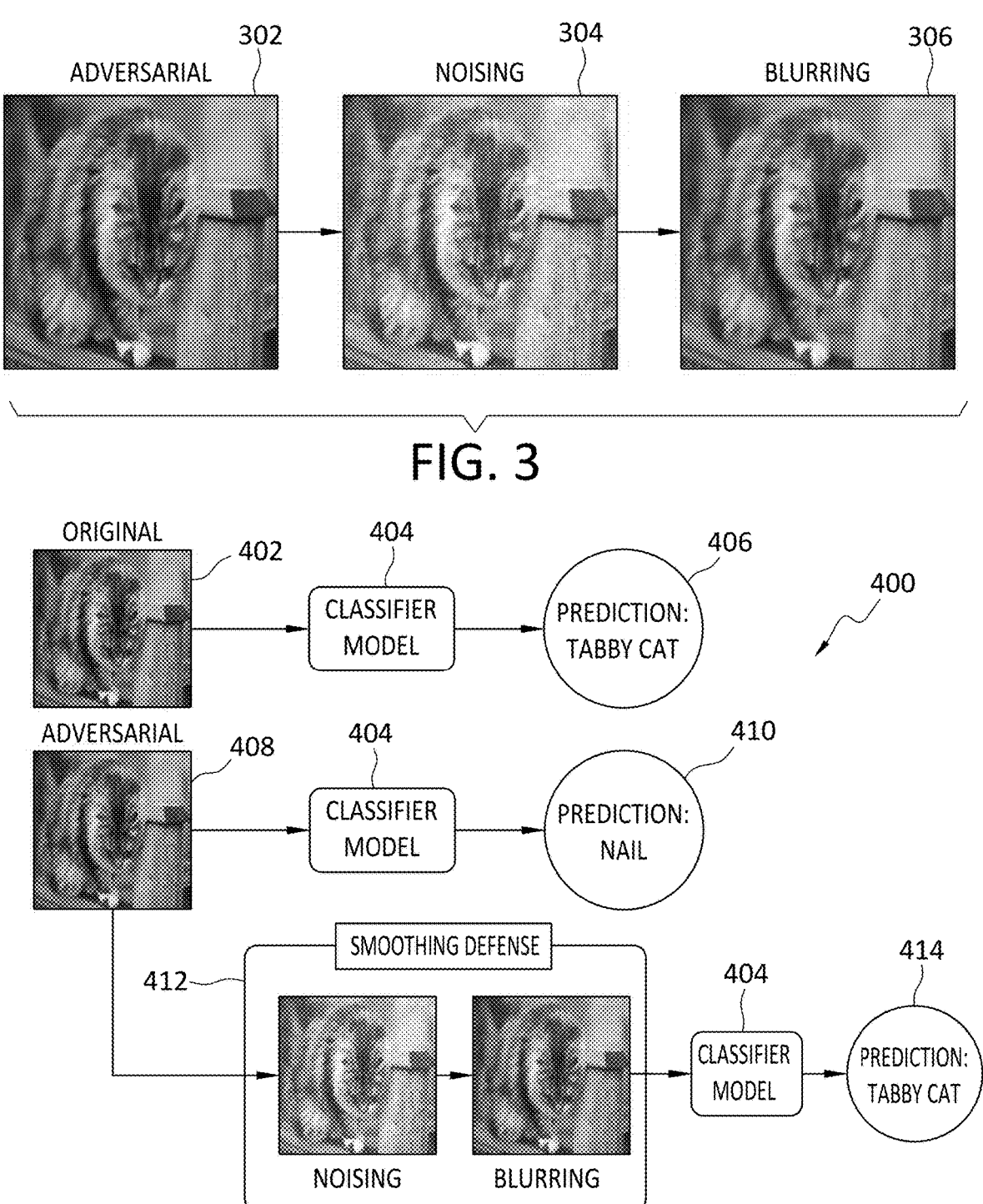
FIG. 3 discloses the effects of the application of a smoothing defense, according to one embodiment.
FIG. 4 discloses an example smoothing defense method according to one embodiment.

With brief reference now to FIG. 3, one possible embodiment of a defense method may comprise the operations: (1) adding gaussian noise to an adversarial image 302, scaled by a factor, to generate the noised image 304; and (2) applying an edge preserving bilateral blur, that is, bilateral filter blurring, onto the noised image 304 to obtain the final image 306. FIG. 3 shows the effects of these operations on an image. Note that the noise is exaggerated in FIG. 3 are to aid visualization, but may be scaled down on a more realistic experimental scenario.

A detailed, more theoretical, discussion on why a method according to one embodiment is effective for defending against adversarial images is provided below. In brief however, the adversarial optimization depends on the local gradient of the model for that particular image. However, this gradient may have spurious fluctuations, and adversarial optimization based on gradients may highlight non-robust specific features of classes. In an embodiment, and as discussed below, the smoothing operation may address both of these observed effects, and effectively counter them. As such, although relatively simple, an embodiment may offer a defense against gradient based attacks without requiring specific costly training, or re-training, of complex deep models.

As indicated in the foregoing discussion, one aspect of an example embodiment concerns the relatively low computational cost associated with implementation. Particularly, some conventional approaches to adversarial attacks involve creating more robust models through adversarial training and/or reconstruction of original images using expensive generative methods. Comparatively with these approaches, an embodiment of the invention may incur much lower computational costs and can be more readily deployed in low resource settings.

As well, an embodiment may comprise an unsupervised defense against adversarial attacks. As such, an embodiment does not rely on, nor require, specific training of any kind, making it a simpler alternative to other approaches that require training and/or heavy, sophisticated models like Generative Adversarial Networks (GANs).

Further, an embodiment may provide the possibility of parallelization. In particular, the blurring pre-processing operations disclosed herein may be generally written as convolutional filters. Modern frameworks for DL (Deep Learning) include implementations of convolutions that can use GPU (graphics processing unit) parallelization to accelerate processing.

C.2 Detailed Aspects of an Example Embodiment

With attention now to FIG. 4, a diagram 400 is presented that discloses various aspects of an embodiment of the invention. As shown, an original image 402 presented to a classifier model 404 may result in the correct classification, a tabby cat in this example.

Next the original image 402 is attacked to create an adversarial image 408. As a result, when the adversarial image 408 is fed to the classifier model 404, an incorrect classification 410 is generated by the classifier model 404. That is, in this illustrative example, the adversarial image 408 is incorrectly classified as a nail, rather than being correctly classified as a tabby cat. Thus, even though the original image 402 and the adversarial image 408 are indistinguishable from each other by the human eye, the attack has resulted in a radically different image classification than would have been rendered had the attack not occurred.

With continued reference to FIG. 4, an embodiment may comprise a smoothing defense module 412 that may perform pre-processing on the adversarial image 408 before the adversarial image is submitted to the classified model 404. As noted herein, functions such as may be implemented by the smoothing defense module 412 may comprise a noising operation, followed by a smoothing operation. After these operations have been implemented, the adversarial image 408, thus processed, may then be submitted to the classifier model 404 which may then, due to the operations performed by the smoothing defense module 412, properly classify the processed adversarial image, which may be the same as, or materially similar to, the original image 402. That is, the classifier model 404 may generate the correct classification 414, tabby cat in this example, for the processed adversarial image. Note that the processed adversarial image may, or may not, be identical to the original image. However, the processed adversarial image, even if not identical to the original image, may be similar enough to the original image as to be properly classified. Further, because an embodiment of the invention generally comprises a method to undo the effect of an adversarial perturbation, the embodiment may be employed to defend against FGSM and/or BIM attacks.

C.3 Some Theoretical Aspects of an Embodiment

As noted earlier herein, gradient attacks depend directly on the gradient of the predictions as a function of the input pixels. This specific gradient is known to have noisy spurious peaks that may vary erratically with small variations of the values in the input pixels. These spurious fluctuations, although not robust to small variations in the features, may be enough for a model to perform a high confidence classification. This phenomenon has been referred to by some as "non-robust features" and these features are an aspect that makes adversarial attacks feasible and effective. Thus, adding noise to the inputs, as is done in an embodiment of the invention, may have the effect of disrupting the spurious, non-robust features that are important for the success of the adversarial attack.

However, in order to also reduce the potential performance damage introduced by the noise addition, some form of smoothing may be helpful. In the particular case of image classification, features such as edges are known to be important for classifiers. As such, an edge-preserving blur, such as bilateral blur filter for example, may be a good candidate for implementing smoothing. Other smoothing options that may be included in an embodiment include Gaussian Blurs, though they may not be edge preserving, and minimization of certain priors such as (TV) Total Variance. As discussed below in connection with one experiment, choosing between these different filters did not, in that experiment, cause significantly different outcomes, as all smoothing operations proved similarly effective for the task at hand.

C.4 Formulation

C.4.1 Noising

The first operation in one example embodiment comprises adding noise to the image. This is reflected in the following relationship:

$$I_{noise} = Io + \alpha_{noise} * \sigma$$

In this relation, $I_{noise}$ is the noised image, and $\alpha_{noise}$ is a factor that scales the noise $\sigma$. In the experiment run for testing one embodiment of the invention, gaussian noise was used. However, the scope of the invention is not limited to the use of gaussian noise.

C.4.2 Blurring

Several types of blur filters exist. Many of them, such as box blur and gaussian blur, are 2D matrices that can be multiplied with the image in a specific way, such as a convolution for example, to generate the blurred image. The fact that some filters are edge-preserving, that is, they do not tend to blur edges as much as a non-edge preserving filter, renders such edge-preserving filters as particularly useful in one embodiment. However, and as demonstrated in one experiment, TV minimization and Gaussian Blurs also worked to a similar level of efficiency. It may be the case, in some circumstances, that one of these methods is better suited than another and thus produces relatively better results in such circumstances.

D. Example Experiments

In order to test an embodiment in the most realistic possible setting, a dataset of high resolution images was used with a large modern architecture, pretrained on ImageNet. Note that the results obtained in connection with these experiments are specific to those experiments should not be assumed to apply to other cases and circumstances. Rather, in such other cases and circumstances, the results may be better, or worse, than the results for the example experiments disclosed herein.

D.1 Dataset

The dataset used in the experiments disclosed herein was OpenImagesV6, which is a very large open dataset by Google, containing millions of annotated images in various classes. For the particular purpose of this test, only one class was employed, in order to see how the classifications were affected. The OpenImages class used for this experiment was 'Cat,' and 100 images from that class were used.

D.2 Model

The architecture used for these experiments was the MobileNet architecture available with pre-trained ImageNet weights, from Tensorflow 2.0. The choice of model was not particularly determinant for this experiment, so the least computationally expensive model was chosen so as to enable the experiments to run faster.

D.3 Experiment

The experiment comprised two portions, namely, [1] deploying the attack with no defenses, and [2] deploying the attack with defenses present. These two portions were performed for FGSM, and again for BIM. For FGSM in particular, the value of $\varepsilon_{FGSM}$ was varied between 0.001 and 0.1, after initial tests showed that values of $\varepsilon_{FGSM}$ below 0.001 caused the FGSM attack to fail.

D.4 Defense

In these experiments, the defense tested comprised, according to one embodiment, Gaussian noising+bilateral filter blur. This blur was used because it is edge preserving, and because initial tests showed that for this particular dataset there was not a marked difference in performance when comparing this technique to gaussian blur or TV minimization. The value of $\alpha$noise used was 0.05 for the BIM attack and 0.1 for the FGSM attack.

E. Example Results

Within this section, the metric of accuracy is used referring to instances where the classification of the original and adversarial image output the same class, regardless if the class is the correct ImageNet class or not. That is, the inquiry in this case is whether the model changes the classification output after the adversarial attack, and not whether the original class corresponds to cat or not, since all images used were cat images.

E.1 BIM

Figure 5:
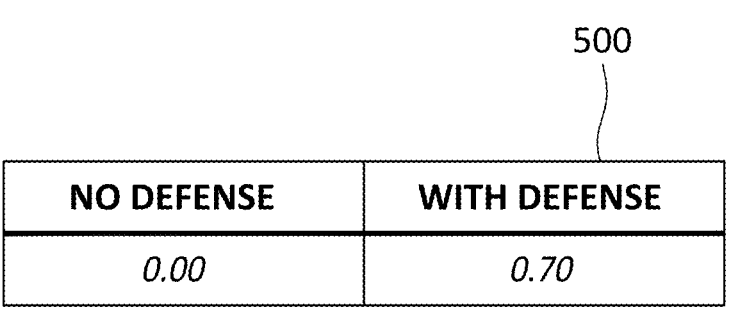
FIG. 5 discloses experimental results.

For a BIM attack, as expected, if no defense is employed, the attack will cause the model to misclassify 100% of the images. In other words, the accuracy of the model is 0. This happens because, by definition and as discussed herein, a BIM attack only stops optimization when the model is misclassifying the image. One embodiment of the invention successfully managed to recover the accuracy to 70, as seen in the table 500 in FIG. 5. Particularly, in the table 500, the values correspond to the accuracy, or the ratio of images that had the correct classification recovered using an embodiment of the invention.

E.2 FGSM

Figure 6:
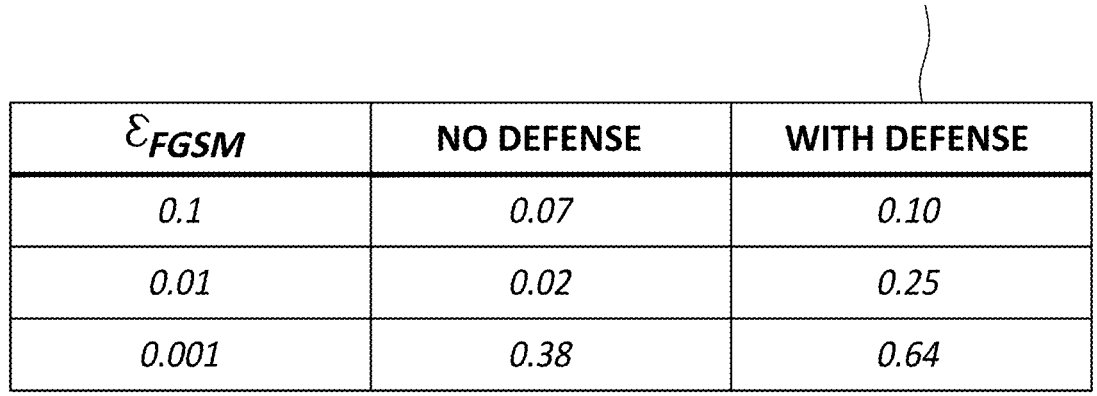
FIG. 6 discloses experimental results.

For all tested values of $\varepsilon_{FGSM}$, and referring now to the table 600 in FIG. 6, the embodiment of the invention that was employed in these experiments increased the accuracy of the classification model compared to the situations where no defense was applied, as can be seen by comparing the values in the 'No defense' column with the values in the 'With defense' column. As in the case of the table 600, the values correspond to the accuracy, or the ratio of images that had the correct classification recovered using an embodiment of the invention. Note however, that this particular embodiment performed less robustly against FGSM (table 600) than against BIM (table 500).

Considering the discussion earlier herein, this behavior might be expected in that the perturbation caused by FGSM is less specific and less optimized, potentially relying less on the spurious features of the gradient. As such, smoothing may affect FGSM less than it affects BIM. However, as shown in the table 600, smoothing is still effective for values of $\varepsilon_{FGSM}$ around 0.001.

E.3 Conclusion

The results of these experiments show that applying the defenses according to one embodiment helps to undo the effect of the adversarial manipulation in the images, most notably for the BIM attack. As previously discussed, this attack is the one with the most potential for damaging results. Yet, even for the FGSM attack, an embodiment of the invention usefully restricts the values of $\varepsilon_{FGSM}$ available for attackers. It is also possible that using more sophisticated noising and denoising methods as part of an embodiment of the invention may yield better results. However, an embodiment of the invention may still serve as a computationally inexpensive, straightforward but effective baseline in protection against adversarial attacks.

F. Example Methods

It is noted with respect to the disclosed methods, including the example method of FIG. 4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. Further Example Embodiments

Following are some further example embodiments of the invention. These are presented only by way of example and are not intended to limit the scope of the invention in any way.

Embodiment 1. A method, comprising: accessing an adversarial image; processing the adversarial image by applying a smoothing defense to the adversarial image; and classifying the processed adversarial image.

Embodiment 2. The method as recited in embodiment 1, wherein the adversarial image was created by an attack on an original image.

Embodiment 3. The method as recited in embodiment 2, wherein the attack is a fast gradient sign method attack.

Embodiment 4. The method as recited in embodiment 2, wherein the attack is a basic iterative method attack.

Embodiment 5. The method as recited in any preceding embodiment, wherein the smoothing defense comprises performing a noising process, and performing a blurring process.

Embodiment 6. The method as recited in embodiment 5, wherein the noising process comprises adding gaussian noise to the adversarial image.

Embodiment 7. The method as recited in embodiment 5, wherein the blurring process comprises an edge-preserving process.

Embodiment 8. The method as recited in any preceding embodiment, wherein a classification of the adversarial image, prior to processing, is different from a classification of an original image that was used to generate the adversarial image.

Embodiment 9. The method as recited in any preceding embodiment, wherein a classification of the adversarial image, after processing, is the same as a classification of an original image that was used to generate the adversarial image.

Embodiment 10. The method as recited in any preceding embodiment, wherein the smoothing defense is an unsupervised process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
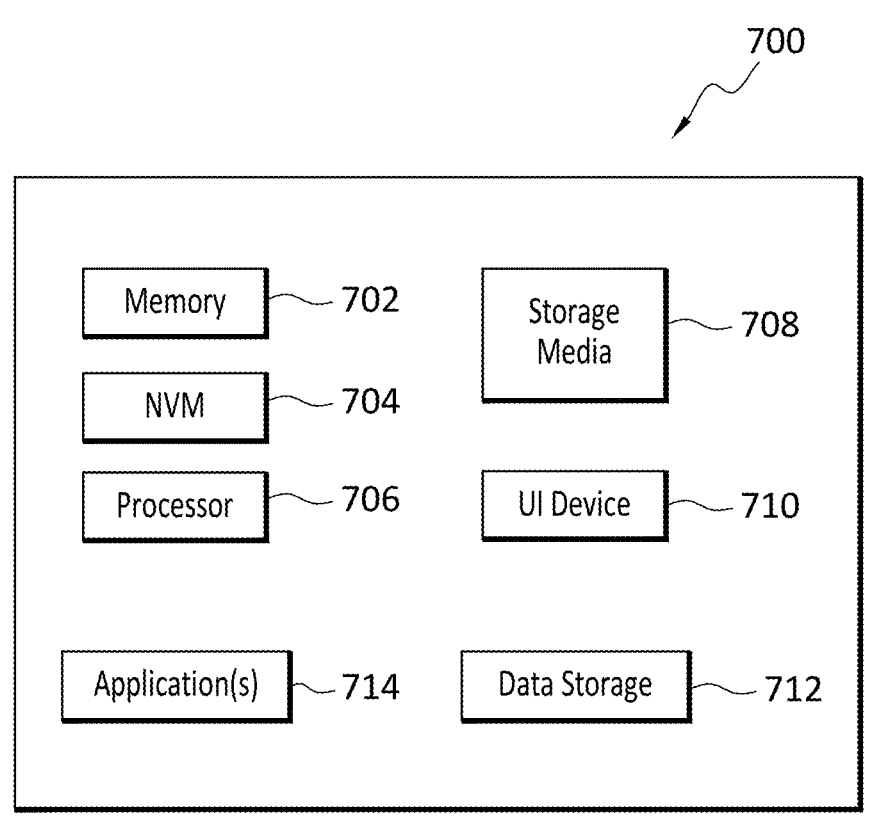
FIG. 7 discloses a computing entity configured and operable to perform any of the disclosed methods, processes, and operations.

With reference briefly now to FIG. 7, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

accessing an adversarial image that was created with either an FGSM (fast gradient sign method) attack executed against an original image or a BIM (basic iterative method) attack executed against the original image;

processing the adversarial image by applying a smoothing defense to the adversarial image to create a processed adversarial image, wherein the smoothing defense comprises:

first, applying a noising process to the adversarial image to create a noised image, wherein the noising process includes adding noise to the adversarial image, and wherein a magnitude of the noise is different depending on whether the FGSM attack was executed against the original image or the BIM attack was executed against the original image, such that different magnitudes of noise are available for selection, where said selection is based on whichever type of attack was executed against the original image, and second, applying a blurring process to the noised image; and classifying the processed adversarial image.

2. The method as recited in claim 1, wherein the blurring process comprises bilateral filter blurring.

3. The method as recited in claim 1, wherein the noising process comprises adding gaussian noise to the adversarial image.

4. The method as recited in claim 1, wherein the blurring process comprises an edge-preserving process.

5. The method as recited in claim 1, wherein a classification of the adversarial image, prior to the processing, is different from a classification of an original image that was used to generate the adversarial image.

6. The method as recited in claim 1, wherein a classification of the adversarial image, after the processing, is the same as a classification of an original image that was used to generate the adversarial image.

7. The method as recited in claim 1, wherein the smoothing defense is an unsupervised process.

8. A non-transitory storage medium having stored therein instructions that are executable by one or more hardware processors to perform operations comprising:

accessing an adversarial image that was created with either an FGSM (fast gradient sign method) attack executed against an original image or a BIM (basic iterative method) attack executed against the original image;

processing the adversarial image by applying a smoothing defense to the adversarial image to create a processed adversarial image, wherein the smoothing defense comprises:

first, applying a noising process to the adversarial image to create a noised image, wherein the noising process includes adding noise to the adversarial image, and wherein a magnitude of the noise is different depending on whether the FGSM attack was executed against the original image or the BIM attack was executed against the original image, such that different magnitudes of noise are available for selection, where said selection is based on whichever type of attack was executed against the original image, and second, applying a blurring process to the noised image; and classifying the processed adversarial image.

9. The non-transitory storage medium as recited in claim 8, wherein the blurring process comprises bilateral filter blurring.

10. The non-transitory storage medium as recited in claim 8, wherein the noising process comprises adding gaussian noise to the adversarial image.

11. The non-transitory storage medium as recited in claim 8, wherein the blurring process comprises an edge-preserving process.

12. The non-transitory storage medium as recited in claim 8, wherein a classification of the adversarial image, prior to the processing, is different from a classification of an original image that was used to generate the adversarial image.

13. The non-transitory storage medium as recited in claim 8, wherein a classification of the adversarial image, after the processing, is the same as a classification of an original image that was used to generate the adversarial image.

14. The non-transitory storage medium as recited in claim 8, wherein the smoothing defense is an unsupervised process.

* * * * *